Figure 7:
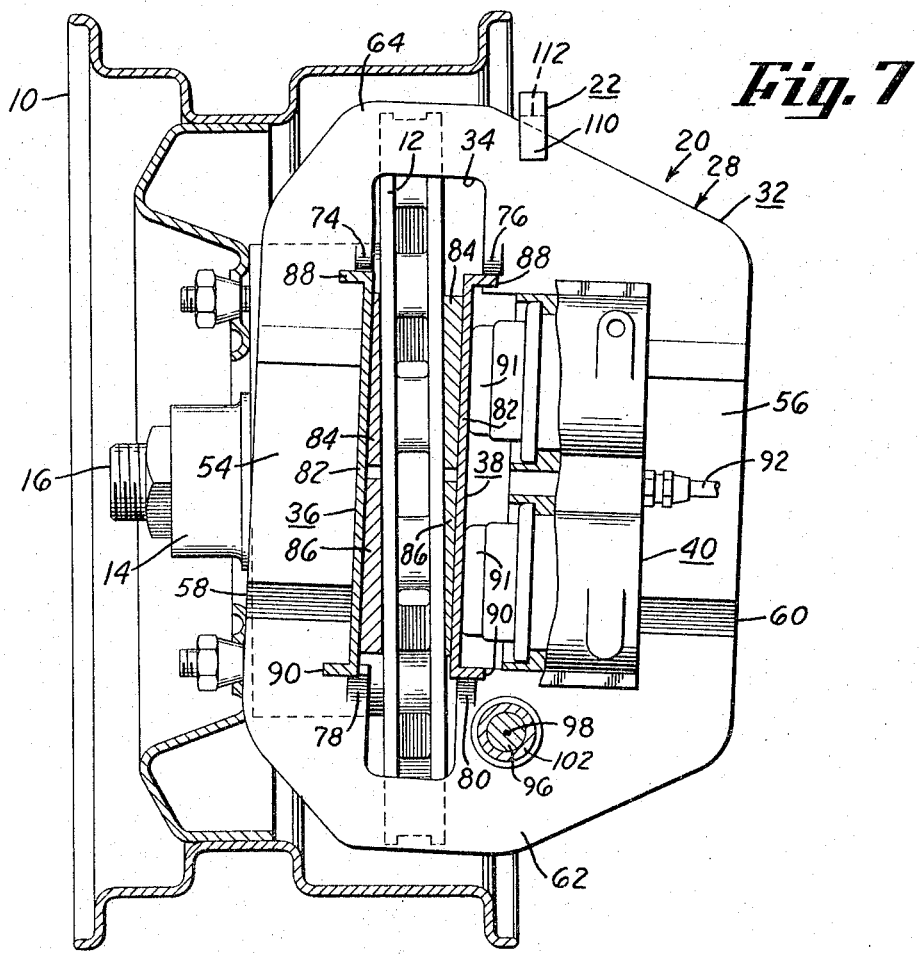

May 2, 1967  E. H. WARWICK  3,317,009
DISC BRAKE
Filed April 21, 1965  3 Sheets-Sheet 1
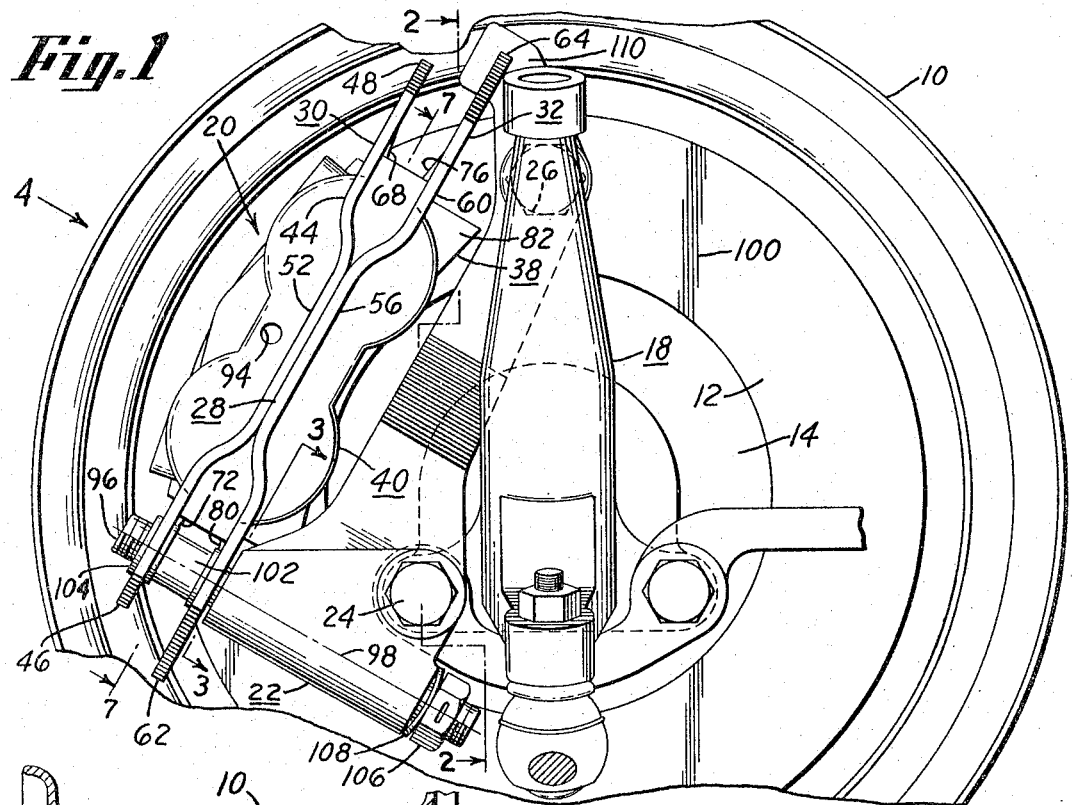
Fig.1
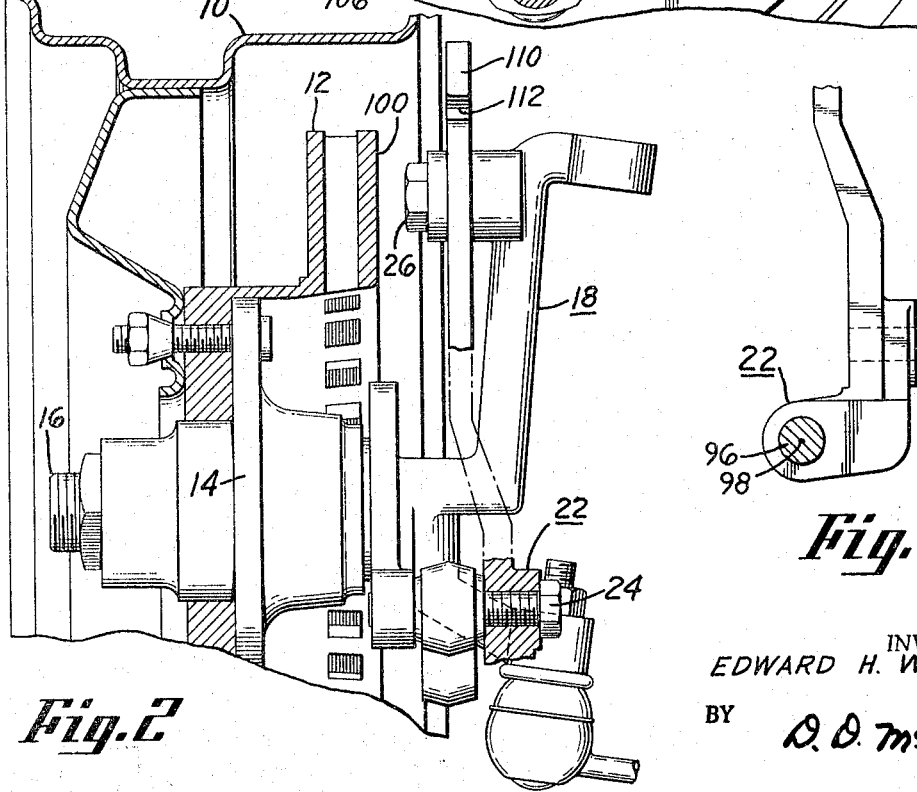
Fig.2
Fig.3
INVENTOR.
EDWARD H. WARWICK
BY  D. D. McGraw
ATTORNEY

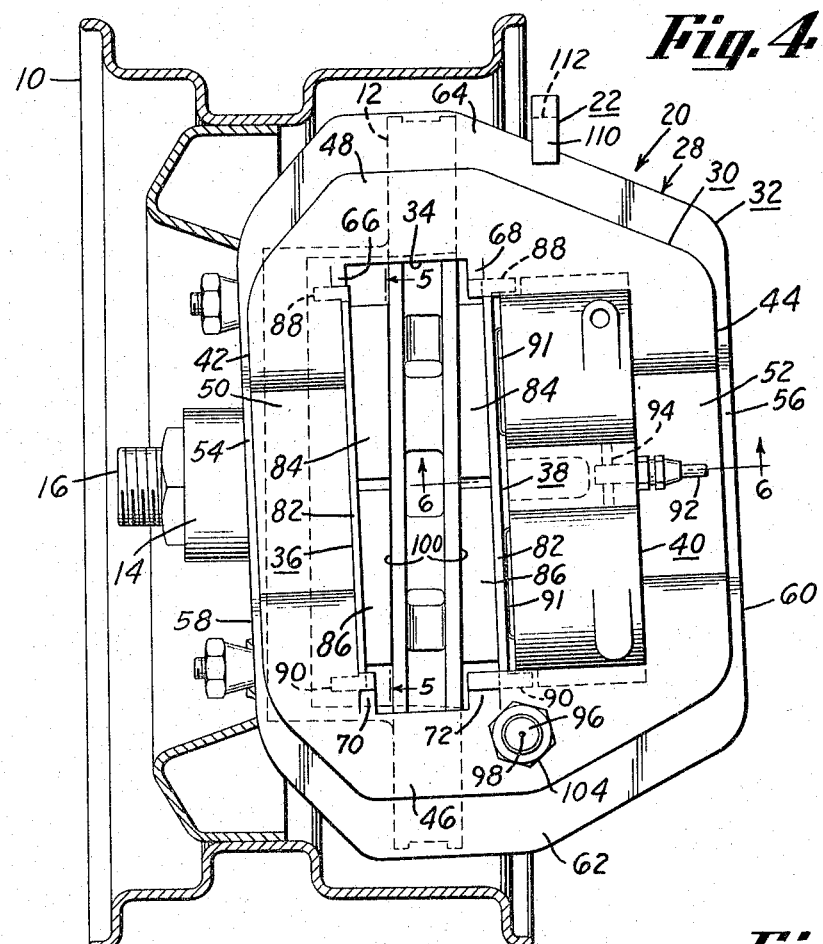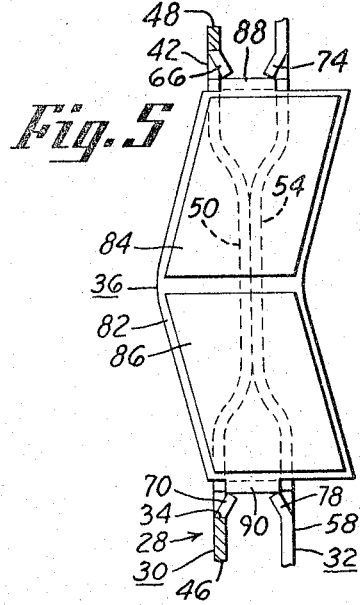

May 2, 1967  E. H. WARWICK  3,317,009
DISC BRAKE

Filed April 21, 1965  3 Sheets-Sheet 3

INVENTOR.
EDWARD H. WARWICK
BY
D. D. McGraw
ATTORNEY

# United States Patent Office 3,317,009
Patented May 2, 1967

3,317,009
DISC BRAKE
Edward H. Warwick, Englewood, Ohio, assignor to General Motors Corporation, Detroit, Mich., a corporation of Delaware
Filed Apr. 21, 1965, Ser. No. 449,841
2 Claims. (Cl. 188—73)

The invention relates to a disc brake and more particularly to one in which a brake caliper assembly is pivotally mounted so that the entire caliper pivots in a plane perpendicular to the plane of the disc to be braked as the braking lining wears.

A caliper assembly embodying the invention is provided with plates enclosing a chordal portion of the disc and having brake friction members including shoes and lining materials secured to the shoes slidably mounted in the opening in the plates through which an arcuate portion of the disc is received. A brake apply member is also mounted in the plate opening and acts on one of the shoe assemblies to urge that shoe into engagement with a friction surface of the disc. This force will also urge the caliper assembly in a pivotal movement so that the other shoe lining on the other side of the disc will also be engaged with a friction surface of the disc. The caliper plates are preferably so formed as to provide sufficient brake apply force transmitting and reaction structure which will minimize lateral expansion of the caliper assembly during braking action.

The caliper assembly is so constructed as to permit sliding movement of the shoe assemblies, with one of the shoe assemblies normally moving relative to the caliper housing as the linings wear. For this purpose the shoes are provided with guide members formed as tenons which are received between spaced portions of the plates making up the caliper housing adjacent the ends of the housing. The end guide members of the shoes are also positioned to engage suitable abutments formed from the plates to take brake torque reaction forces directly from the shoes to the plate so that the torque reaction forces are not required to be transmitted through any portion of the brake apply member.

The brake apply member is preferably a hydraulic cylinder assembly with the housing of the cylinder assembly being removably mounted in the plates in a manner generally similar to that of the brake shoe assemblies. The housing of the cylinder assembly is positioned against one side of the opening in the plates and normally remains in this position so that the hydraulic cylinder assembly does not move relative to the plates. The construction is such that the caliper assembly may be removed from the disc after which the shoe assembly and the hydraulic cylinder assembly may be removed through the opening provided for the disc without requiring disassembly of other mounting elements.

It is preferred to utilize a caliper construction wherein the shoe and lining assembly lightly engage the disc at all times so that no shoe adjusting mechanism is necessary. It has been found that this method of eliminating the necessity for shoe adjustment for lining wear will operate satisfactorily for an extended period of brake operation and utilization.

The caliper assembly is preferably hinged so that the hinge axis extends in a plane parallel to the plane of rotation of the disc and substantially perpendicular to the plate or housing portion of the caliper assembly. A suitable hinge plate or mounting member is secured to a non-rotatable portion of the entire assembly on which the disc rotates, and is also preferably provided with a guiding section at the other end of the plate housing construction from the hinge axis so that the caliper is maintained in the desired brake alignment at all times. Due to the pivotal action of the caliper assembly as the linings wear, the linings will wear unevenly from end to end. For this reason they are preferably made with one lining end thicker than the other lining end to provide additional lining wear capability before replacement is required.

In the drawings:
FIGURE 1 is an elevation view with parts broken away and in section of a disc brake assembly embodying the invention.
FIGURE 2 is a cross section view taken in the direction of arrows 2—2 of FIGURE 1 with parts broken away in section.
FIGURE 3 is a view of a portion of the hinge plate taken in the direction of arrows 3—3 as shown in FIGURE 1, with parts broken away.
FIGURE 4 is a view of the mechanism of FIGURE 1, taken in the direction of arrow 4 of that figure.
FIGURE 5 is a partial section view taken in the direction of arrows 5—5 of FIGURE 4.
FIGURE 6 is a partial section view taken in the direction of arrows 6—6 of FIGURE 4.
FIGURE 7 is a partial section view with parts broken away and taken in the direction of arrows 7—7 of FIGURE 1, but showing the brake linings in a worn condition.

The mechanism shown in FIGURE 1 includes a wheel 10 to which is suitably secured a disc 12. The wheel may have a tire, not shown, mounted on it. The wheel and disc assembly is mounted by means of hub 14 for rotation on the axle 16. For purposes of illustration a vehicle front wheel and brake assembly is illustrated. The axle 16 is part of the steering knuckle assembly 18. A brake caliper assembly 20 is pivotally mounted to a hinge plate 22 which is in turn secured by means of bolts 24 and 26 to the steering knuckle assembly 18. Thus the hinge plate 22 and the steering knuckle assembly 18 combine to provide a caliper support member and also act as a disc support member by virtue of the rotatable mounting of the disc and wheel assembly on the axle 16.

The brake caliper assembly 20 includes a housing or support and guide subassembly 28. Subassembly 28 is formed of two plate members 30 and 32. As seen in FIGURES 1, 4 and 7, the plate members are generally rectangular in plan view with an aligned center opening 34 through which an arcuate or chordal portion of the disc 12 is received. Brake friction assemblies 36 and 38 are also received in the aligned opening 34. Likewise the brake force apply assembly 40 is received in opening 34.

Referring to the housing 28 in further detail, plate 30 has side sections 42 and 44 and end sections 46 and 48. The center portions 50 and 52 of the side sections 42 and 44 occupy major portions of the side sections and are depressed relative to the end sections 46 and 48 and the minor portions of the side sections joining the side sections and end sections. Thus as viewed in FIGURE 1 an edge view of plate 30 has a somewhat gull-like appearance. Plate 32 is similarly constructed in that the center portions 54 and 56 of the plate side sections 58 and 60 occupy the major portions of the side sections and are out of the plane of the plate end sections 62 and 64 as well as minor portions of the side sections. Therefore as seen in FIGURE 1 plate 32 also has a gull-like end appearance but is reversed as compared to plate 30. The plate center sections 50 and 54 are joined together as are the plate center sections 52 and 56. They may be secured together in any suitable manner, such as welding. Therefore the adjacent plate end sections 46 and 62, and 48 and 64, are spaced apart but generally parallel. Plate 30 is somewhat smaller in its outer periphery than is plate 32. This is desirable because of the proximity of the caliper assembly 20 to the wheel 10. Abutments or tabs 66 and 68 are formed at one end of opening 34 in plate 30 and similar abutments or tabs 70 and 72 are formed on the plate at the other end of opening 34. These tabs extend inwardly toward plate 32, as is best seen in FIGURE 5. Similar tabs or abutments 74, 76, 78 and 80 are provided on plate 32 in edges of opening 34 and in alignment with the tabs of plate 30. The tabs of plate 32 likewise extend inwardly of the caliper housing 28. This construction is likewise best seen in FIGURE 5.

The brake friction assemblies 36 and 38 may be identical in construction. Each assembly includes a shoe 82 and lining segments 84 and 86 secured to one side of the shoe 82 so that they may be brought into braking engagement with a friction surface of the disc. As can be seen in FIGURE 5, the shoe is preferably formed with a slight V so as to take full advantage of the shoe and friction lining construction during its engagement with an arcuate portion of the disc. End guides or tenons 88 and 90 are provided on each end of shoe 82. Tenon 88 is aligned for abutting engagement with tabs 66 and 74 and tenon 90 is aligned for abutting engagement with tabs 70 and 78. It may be noted that the edge of lining 84 adjacent tenon 88 is thick while the edge of lining 86 adjacent tenon 90 is relatively thin, with the thickness of the lining segments tapering accordingly. When an identical brake friction assembly is used for friction assembly 38, the assembly is merely reversed so that the lining segments continue to be engageable with the disc 12 and the tenons extend away from the disc. Thus the thickest edge of one lining segment on one brake friction assembly is in direct aligned relation with the thinnest edge of the lining segment of the other brake friction assembly and on opposite sides of the friction disc. This is the condition when the brake linings are new. As they wear to the condition shown in FIGURE 7, the linings assume a reverse appearance. This is due to the hinge construction of the caliper assembly. Tenons 88 and 90 of each of the brake friction assemblies 36 and 38 also extend between the end sections of the plates 30 and 32 so that they are restrained from movement radially of this disc.

The brake force apply assembly 40 is preferably provided as a hydraulic cylinder assembly. As shown in the drawings, the assembly 40 has a housing in which a pair of cylinders is provided and in which pistons 91 are reciprocably received so that they engage the shoe of friction assembly 38 in substantial alignment with each of the lining segments of that assembly. A suitable brake line 92 is connected to pressure passages 94 in the housing of assembly 40 so that the pistons 91 are moved outwardly under pressure to apply braking force to the brake friction assembly 38 which in turn applies braking force to the disc 12. The reaction of the pressure in the cylinders acts against the plates 30 and 32 so that the caliper assembly 20 tends to pivot clockwise as seen in FIGURE 4 thereby applying braking force to both sides of disc 12 by the brake friction assemblies 36 and 38. Since the caliper assembly utilizes a slight engagement arrangement of the brake assembly with the disc at all times, no actual movement occurs other than that necessary to adjust for lining wear. As the brakes are applied it can be seen that brake torque reaction is transmitted from the brake friction assembly to the ends of the plates 30 and 32 by means of the tenons on the brake friction assembly and the abutments or tabs on the plates. The brake apply forces exerted by the brake force apply assembly 40 are exerted on the side sections of the plates 30 and 32. Thus these two forces are isolated so that the brake apply assembly 40 does not have to also carry the brake disc reaction force.

The construction of the hinge or pivot is best shown in FIGURES 1, 4 and 7. The hinge includes a hinge or pivot pin 96 which has an axis 98 extending substantially parallel to the friction surfaces of disc 12 and offset from the disc friction surface 100, which is the friction surface on the same side of the disc as that of brake force apply assembly 40 and brake friction assembly 38. The axis of pin 96 is also substantially perpendicular to the planes of plates 30 and 32, which are chordally positioned relative to the disc 12. A suitable spacer 102 is provided between the plate ends 46 and 64. Suitable nuts 104 and 106 secure the pivot pin in place relative to the hinge plate 22 and the plates 30 and 32. The pin is preferably rotatable in the passage of hinge plate 22 through which it extends. A take-up spring 108 may be provided to maintain the pin in tight but movable engagement with the hinge plate and the plates 30 and 32. A suitable bearing may also be provided between plate 32 and hinge plate 22 if desired. In some constructions, spacer 102 and nut 104 may be made as a common part.

The end 110 of hinge plate 22 opposite the hinge may be so constructed as to pass through the plane of the end 64 of plate 32. The plate end 110 has a notch 112 provided therein through which plate end 64 passes. As can be seen in FIGURE 1, there is clearance provided for the plate so that as the plate pivots clockwise due to lining wear, the plate movement is not restricted. When the shoe lining has worn to a point where it absolutely must be replaced, which point is illustrated as being approached in FIGURE 7, the plate may engage the hinge plate end so that further pivotal movement will not occur, thereby preventing damage to either the plates or the disc.

A disc brake assembly has therefore been provided wherein a hinge plate is mounted on the steering knuckle or other suitable part of the vehicle to which is secured a housing formed of a pair of plates which are pivotal about a hinge and guided by a hinge plate. The caliper assembly including the plate-formed housing contains a pair of brake friction members and a brake force apply member which maintains the brake friction members in light engagement with the disc when the brakes are released. When the brakes are applied, the brake apply force is transmitted and its reaction also occurs transversely of the disc and the caliper assembly. The caliper assembly is also arranged so that the brake torque reaction is taken longitudinally of the assembly without being applied through the brake force apply member. No means of adjustment of the shoe and lining assembly is required, thereby reducing the amount of displacement occurring in the brake force apply member when the brakes are applied and released. The linings are so constructed that maximum wear distance may be provided within a minimum space. The brake friction assemblies are not required to slide back and forth upon each brake application and release. By utilization of a stamped component concept, more economical manufacture of the subject unit may be obtained than the manufacture f cast caliper units.

What is claimed is:

1. A disc brake caliper having a hydraulic cylinder assembly, first and second brake shoe and lining members movable substantially transversely of a disc to be braked thereby by said hydraulic cylinder assembly, a reaction and support member comprising plate means encircling said hydraulic cylinder assembly and said brake shoe and lining members and taking brake apply reaction force substantially transversely of the disc to be braked and taking brake torque reaction forces substantially parallel to the disc to be braked, and means pivotally mounting said reaction member near one end thereof for pivotal movement substantially transversely of the disc to be braked, said last means including a guiding section and an end portion extending adjacent the other end of said reaction member and projecting into the path of pivoting movement of said reaction member to engage an edge of the reaction member upon a predetermined amount of brake lining wear.

2. A disc brake caliper as described in claim 1, wherein said reaction and support member plate means comprises a pair of plates secured together and having portions thereof in planar spaced relation, said plate portions having force transmitting tabs and said shoes having tenons formed on the ends thereof received intermediate said plate portions and engaging said tabs in brake torque reaction force transmitting relation, and at least one of said shoes being slidably guided by said plate portions in cooperation with said tenons.

References Cited by the Examiner

UNITED STATES PATENTS

| | | | |
|---|---|---|---|
| 3,199,632 | 8/1965 | Chousings | 188—73 |
| 3,207,268 | 9/1965 | Mossey | 188—73 |
| 3,211,261 | 10/1965 | Chousings | 188—73 |

FOREIGN PATENTS

| | | |
|---|---|---|
| 1,331,797 | 5/1963 | France. |
| 732,272 | 6/1955 | Great Britain. |

MILTON BUCHLER, *Primary Examiner.*

G. E. A. HALVOSA, *Assistant Examiner.*